(12) United States Patent
Purkayastha et al.

(10) Patent No.: US 12,207,169 B2
(45) Date of Patent: Jan. 21, 2025

(54) CAPABILITIES AND CONFIGURATION FOR NONDATA WIRELESS SERVICES

(71) Applicant: QUALCOMM Incorporated, San Diego, CA (US)

(72) Inventors: Punyaslok Purkayastha, San Diego, CA (US); Gavin Bernard Horn, La Jolla, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/645,279

(22) Filed: Dec. 20, 2021

(65) Prior Publication Data

US 2023/0199454 A1    Jun. 22, 2023

(51) Int. Cl.
*H04W 4/50* (2018.01)
*H04W 24/02* (2009.01)
*H04W 72/04* (2023.01)

(52) U.S. Cl.
CPC ............ *H04W 4/50* (2018.02); *H04W 24/02* (2013.01); *H04W 72/04* (2013.01)

(58) Field of Classification Search
CPC ......... H04W 4/30; H04W 4/50; H04W 40/04; H04W 76/12; H04W 28/12; H04W 72/02; H04W 8/18
USPC ......................... 455/435.1; 370/329; 375/262
See application file for complete search history.

(56) References Cited

U.S. PATENT DOCUMENTS

| | | | | |
|---|---|---|---|---|
| 9,538,563 | B2 * | 1/2017 | Wang | H04W 76/12 |
| 9,854,499 | B2 * | 12/2017 | Wang | H04W 28/12 |
| 10,412,655 | B2 * | 9/2019 | Wang | H04W 28/12 |
| 11,016,679 | B2 * | 5/2021 | Secatch | G06F 3/061 |
| 11,153,802 | B2 * | 10/2021 | Wang | H04W 40/04 |
| 2016/0105838 | A1 * | 4/2016 | Wang | H04W 40/04 370/329 |
| 2017/0086123 | A1 * | 3/2017 | Wang | H04W 40/04 |
| 2018/0084477 | A1 * | 3/2018 | Wang | H04W 28/12 |
| 2018/0332441 | A1 * | 11/2018 | Shaw | H04L 63/105 |
| 2019/0357113 | A1 * | 11/2019 | Wang | H04W 76/12 |
| 2020/0004443 | A1 * | 1/2020 | Secatch | G06F 3/0659 |
| 2021/0376898 | A1 * | 12/2021 | Levitsky | H04B 7/0626 |

(Continued)

FOREIGN PATENT DOCUMENTS

| | | | | |
|---|---|---|---|---|
| CN | 104662856 | A * | 5/2015 | H04L 1/004 |
| WO | WO-2021173052 | A1 * | 9/2021 | G01S 5/10 |

OTHER PUBLICATIONS

R. De Tommaso do Valle and D. C. Muchaluat-Saade, "MeshAdmin: an integrated platform for wireless mesh network management," 2012 IEEE Network Operations and Management Symposium, Maui, HI, USA, 2012, pp. 293-301, doi: 10.1109/NOMS.2012.6211911. (Year: 2012).*

(Continued)

*Primary Examiner* — William D Cumming
(74) *Attorney, Agent, or Firm* — Harrity & Harrity, LLP

(57) ABSTRACT

Various aspects of the present disclosure generally relate to wireless communication. In some aspects, a management network node may receive, from a communication network node, a plurality of non-data wireless service (NDWS) configurations. The management network node may transmit, to the communication network node, a configuration indication associated with a selected NDWS configuration of the plurality of NDWS configurations. Numerous other aspects are described.

29 Claims, 12 Drawing Sheets

(56) References Cited

U.S. PATENT DOCUMENTS

| | | | | |
|---|---|---|---|---|
| 2023/0078737 | A1* | 3/2023 | Haque | H04B 5/79 |
| | | | | 375/262 |
| 2023/0180276 | A1* | 6/2023 | Gerami | H04W 72/02 |
| | | | | 370/329 |
| 2023/0199454 | A1* | 6/2023 | Purkayastha | H04W 4/50 |
| | | | | 370/329 |
| 2023/0199473 | A1* | 6/2023 | Purkayastha | H04W 8/18 |
| | | | | 455/435.1 |
| 2023/0239104 | A1* | 7/2023 | Yerramalli | H04L 5/0051 |
| | | | | 370/330 |
| 2023/0354293 | A1* | 11/2023 | Maamari | H04W 72/21 |
| 2024/0007203 | A1* | 1/2024 | Liu | H04W 24/10 |
| 2024/0284271 | A1* | 8/2024 | Goyal | H04W 36/0061 |

OTHER PUBLICATIONS

International Search Report and Written Opinion—PCT/US2022/079636—ISA/EPO—Feb. 14, 2023.
Nokia., et al., "Pre-Configuration and Initiation of On-Demand PRS Associated With Qos/Radio Conditions", 3GPP TSG-RAN WG2 Meeting #114 Electronic, R2-2106355, 3rd Generation Partnership Project, Mobile Competence Centre, 650, Route Des Lucioles, F-06921 Sophia-Antipolis Cedex, France, vol. RAN WG2, No. Elbonia, May 19, 2021-May 27, 2021, May 11, 2021, XP052007709, p. 3, lines 1-16, figure 1, 4 Pages.

* cited by examiner

CAPABILITIES AND CONFIGURATION FOR NONDATA WIRELESS SERVICES

FIELD OF THE DISCLOSURE

Aspects of the present disclosure generally relate to wireless communication and to techniques and apparatuses for capabilities and configuration for non-data wireless services.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a management network node. The method may include receiving, from a communication network node, a plurality of non-data wireless service (NDWS) configurations. The method may include transmitting, to the communication network node, a configuration indication associated with a selected NDWS configuration of the plurality of NDWS configurations.

Some aspects described herein relate to a method of wireless communication performed by a management network node. The method may include receiving, from a communication network node, a request to modify an NDWS configuration. The method may include transmitting, to the communication network node, a modified NDWS configuration that is based at least in part on the request to modify the NDWS configuration.

Some aspects described herein relate to a method of wireless communication performed by a communication network node. The method may include transmitting, to a management network node, a plurality of NDWS configurations. The method may include receiving, from the management network node, a configuration indication associated with a selected NDWS configuration of the plurality of NDWS configurations.

Some aspects described herein relate to a method of wireless communication performed by a communication network node. The method may include transmitting, to a management network node, a request to modify an NDWS configuration. The method may include receiving, from the management network node, a modified NDWS configuration that is based at least in part on the request to modify the NDWS configuration.

Some aspects described herein relate to an apparatus for wireless communication performed by a management network node. The apparatus may include a memory and one or more processors, coupled to the memory. The one or more processors may be configured to receive, from a communication network node, a plurality of NDWS configurations. The one or more processors may be configured to transmit, to the communication network node, a configuration indication associated with a selected NDWS configuration of the plurality of NDWS configurations.

Some aspects described herein relate to an apparatus for wireless communication performed by a management network node. The apparatus may include a memory and one or more processors, coupled to the memory. The one or more processors may be configured to receive, from a communication network node, a request to modify an NDWS configuration. The one or more processors may be configured to transmit, to the communication network node, a modified NDWS configuration that is based at least in part on the request to modify the NDWS configuration.

Some aspects described herein relate to an apparatus for wireless communication performed by a communication network node. The apparatus may include a memory and one or more processors, coupled to the memory. The one or more processors may be configured to transmit, to a management network node, a plurality of NDWS configurations. The one or more processors may be configured to receive, from the management network node, a configuration indication associated with a selected NDWS configuration of the plurality of NDWS configurations.

Some aspects described herein relate to an apparatus for wireless communication performed by a communication network node. The apparatus may include a memory and one or more processors, coupled to the memory. The one or more processors may be configured to transmit, to a management network node, a request to modify an NDWS configuration. The one or more processors may be configured to receive, from the management network node, a modified NDWS configuration that is based at least in part on the request to modify the NDWS configuration.

Some aspects described herein relate to a non-transitory computer-readable medium that stores a set of instructions for wireless communication by a management network node. The set of instructions, when executed by one or more processors of the management network node, may cause the management network node to receive, from a communication network node, a plurality of NDWS configurations. The set of instructions, when executed by one or more processors of the management network node, may cause the management network node to transmit, to the communication network node, a configuration indication associated with a selected NDWS configuration of the plurality of NDWS configurations.

Some aspects described herein relate to a non-transitory computer-readable medium that stores a set of instructions for wireless communication by a management network node. The set of instructions, when executed by one or more processors of the management network node, may cause the management network node to receive, from a communication network node, a request to modify an NDWS configuration. The set of instructions, when executed by one or more processors of the management network node, may cause the management network node to transmit, to the communication network node, a modified NDWS configuration that is based at least in part on the request to modify the NDWS configuration.

Some aspects described herein relate to a non-transitory computer-readable medium that stores a set of instructions for wireless communication by a communication network node. The set of instructions, when executed by one or more processors of the communication network node, may cause the communication network node to transmit, to a management network node, a plurality of NDWS configurations. The set of instructions, when executed by one or more processors of the communication network node, may cause the communication network node to receive, from the management network node, a configuration indication associated with a selected NDWS configuration of the plurality of NDWS configurations.

Some aspects described herein relate to a non-transitory computer-readable medium that stores a set of instructions for wireless communication by a communication network node. The set of instructions, when executed by one or more processors of the communication network node, may cause the communication network node to transmit, to a management network node, a request to modify an NDWS configuration. The set of instructions, when executed by one or more processors of the communication network node, may cause the communication network node to receive, from the management network node, a modified NDWS configuration that is based at least in part on the request to modify the NDWS configuration.

Some aspects described herein relate to an apparatus for wireless communication. The apparatus may include means for receiving, from a communication network node, a plurality of NDWS configurations. The apparatus may include means for transmitting, to the communication network node, a configuration indication associated with a selected NDWS configuration of the plurality of NDWS configurations.

Some aspects described herein relate to an apparatus for wireless communication. The apparatus may include means for receiving, from a communication network node, a request to modify an NDWS configuration. The apparatus may include means for transmitting, to the communication network node, a modified NDWS configuration that is based at least in part on the request to modify the NDWS configuration.

Some aspects described herein relate to an apparatus for wireless communication. The apparatus may include means for transmitting, to a management network node, a plurality of NDWS configurations. The apparatus may include means for receiving, from the management network node, a configuration indication associated with a selected NDWS configuration of the plurality of NDWS configurations.

Some aspects described herein relate to an apparatus for wireless communication. The apparatus may include means for transmitting, to a management network node, a request to modify an NDWS configuration. The apparatus may include means for receiving, from the management network node, a modified NDWS configuration that is based at least in part on the request to modify the NDWS configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
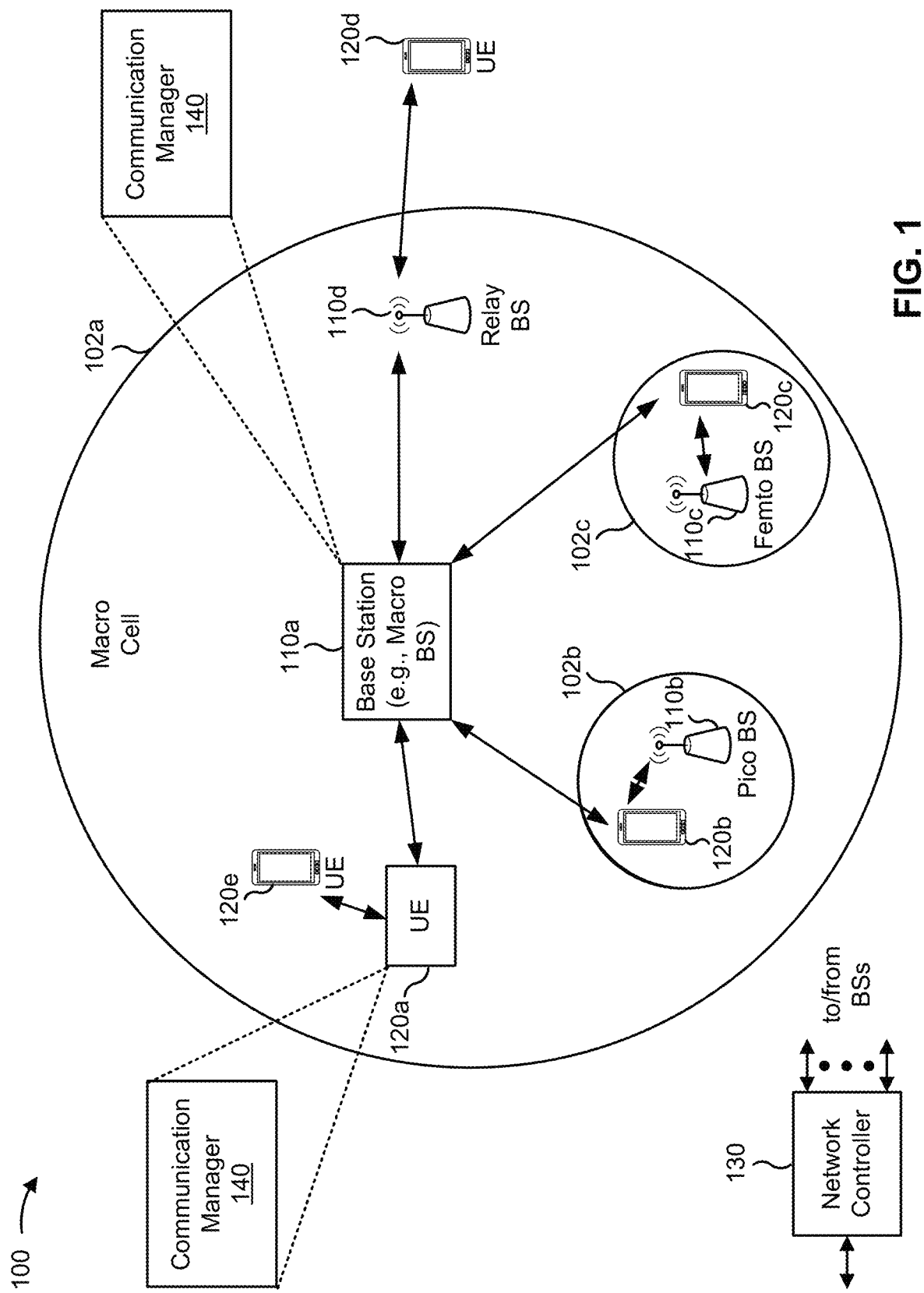
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the communication network node may include a communication manager 140. As described in more detail elsewhere herein, the communication manager 140 may transmit, to a management network node, a plurality of non-data wireless service (NDWS) configurations; and receive, from the management network node, a configuration indication associated with a selected NDWS configuration of the plurality of NDWS configurations. Additionally, or alternatively, the communication manager 140 may transmit, to a management network node, a request to modify an NDWS configuration; and receive, from the management network node, a modified NDWS configuration that is based at least in part on the request to modify the NDWS configuration. Additionally, or alternatively, the communication manager 140 may perform one or more other operations described herein.

As indicated above, FIG. 1 is provided as an example. Other examples may differ from what is described with regard to FIG. 1.

Figure 2:
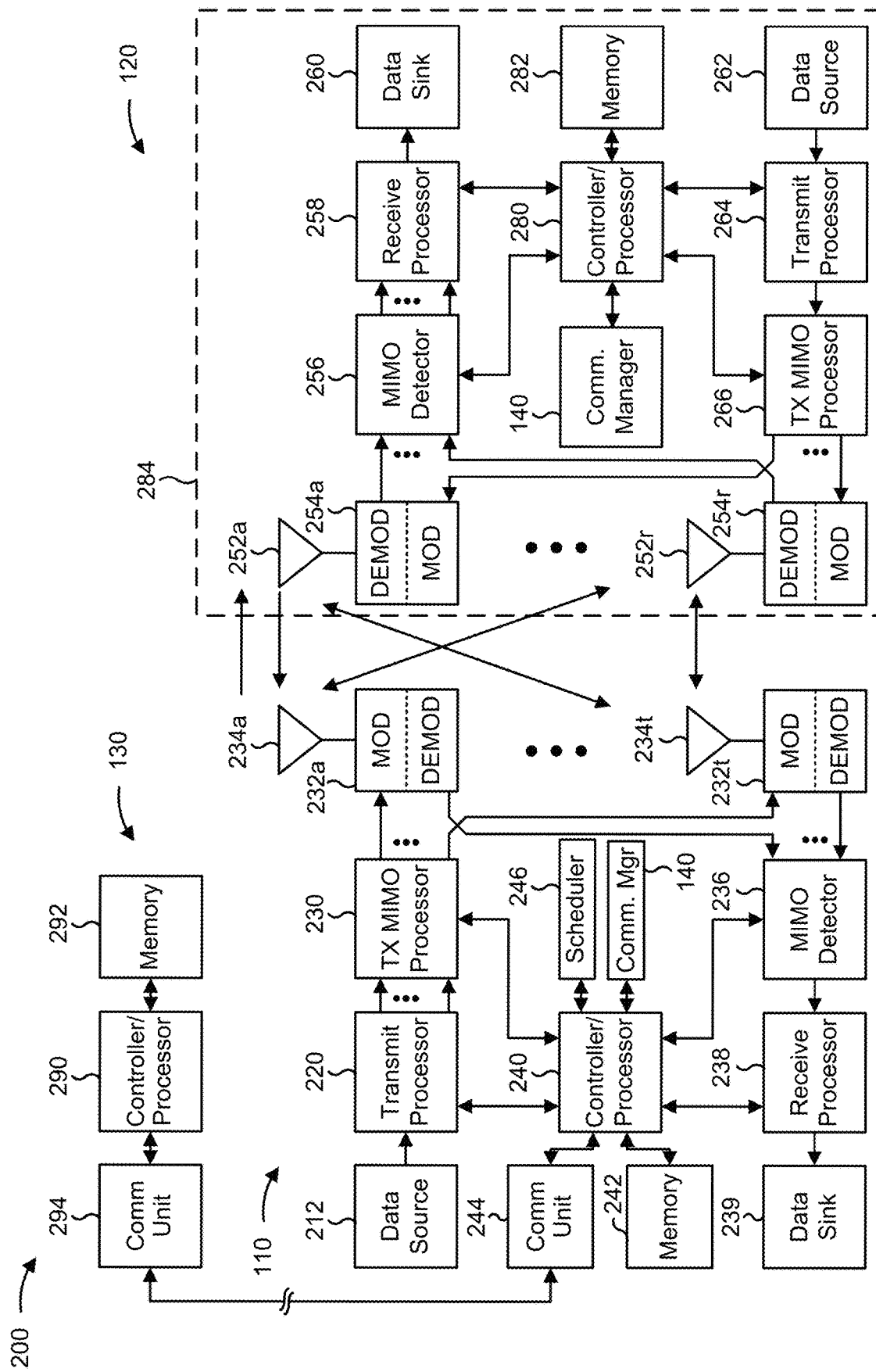
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with capabilities and configuration for NDWS, as described in more detail elsewhere herein. In some aspects, the communication network node described herein may be the base station 110, may be included in the base station 110, or may include one or more components of the base station 110 shown in FIG. 2. In some aspects, the communication network node described herein may be the UE 120, may be included in the UE 120, or may include one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the management network node includes means for receiving, from a communication network node, a plurality of NDWS configurations; and/or means for transmitting, to the communication network node, a configuration indication associated with a selected NDWS configuration of the plurality of NDWS configurations. In some aspects, the means for the management network node to perform the operations described herein may include, for example, one or more of a processor 1120, a memory 1130, an input component 1140, an output component 1150, and/or a communication component 1160.

In some aspects, the management network node includes means for receiving, from a communication network node, a request to modify a NDWS configuration; and/or means for transmitting, to the communication network node, a modified NDWS configuration that is based at least in part on the request to modify the NDWS configuration. In some aspects, the means for the management network node to perform the operations described herein may include, for example, one or more of a processor 1120, a memory 1130, an input component 1140, an output component 1150, and/or a communication component 1160.

In some aspects, the communication network node includes means for transmitting, to a management network node, a plurality of NDWS configurations; and/or means for receiving, from the management network node, a configuration indication associated with a selected NDWS configuration of the plurality of NDWS configurations. In some aspects, the means for the communication network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the communication network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the communication network node includes means for transmitting, to a management network node, a request to modify a NDWS configuration; and/or means for receiving, from the management network node, a modified NDWS configuration that is based at least in part on the request to modify the NDWS configuration. In some aspects, the means for the communication network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the communication network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
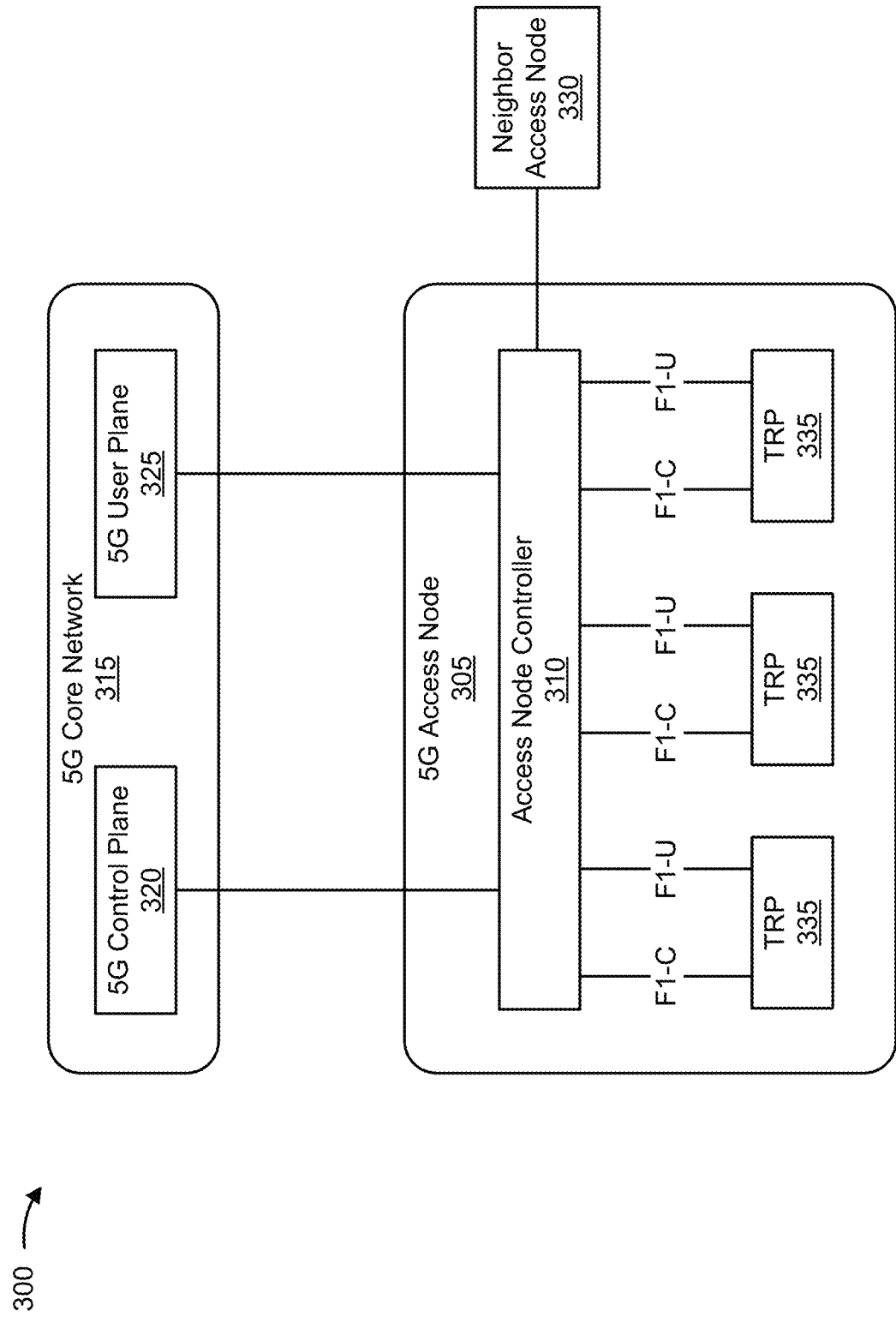
FIG. 3 is a diagram illustrating an example logical architecture of a distributed radio access network, in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

In some aspects, as described further herein, the TRP 335 may be a network node that is configured to provide an NDWS configuration and/or modify an NDWS configuration.

As indicated above, FIG. 3 is provided as an example. Other examples may differ from what was described with regard to FIG. 3.

Figure 4:
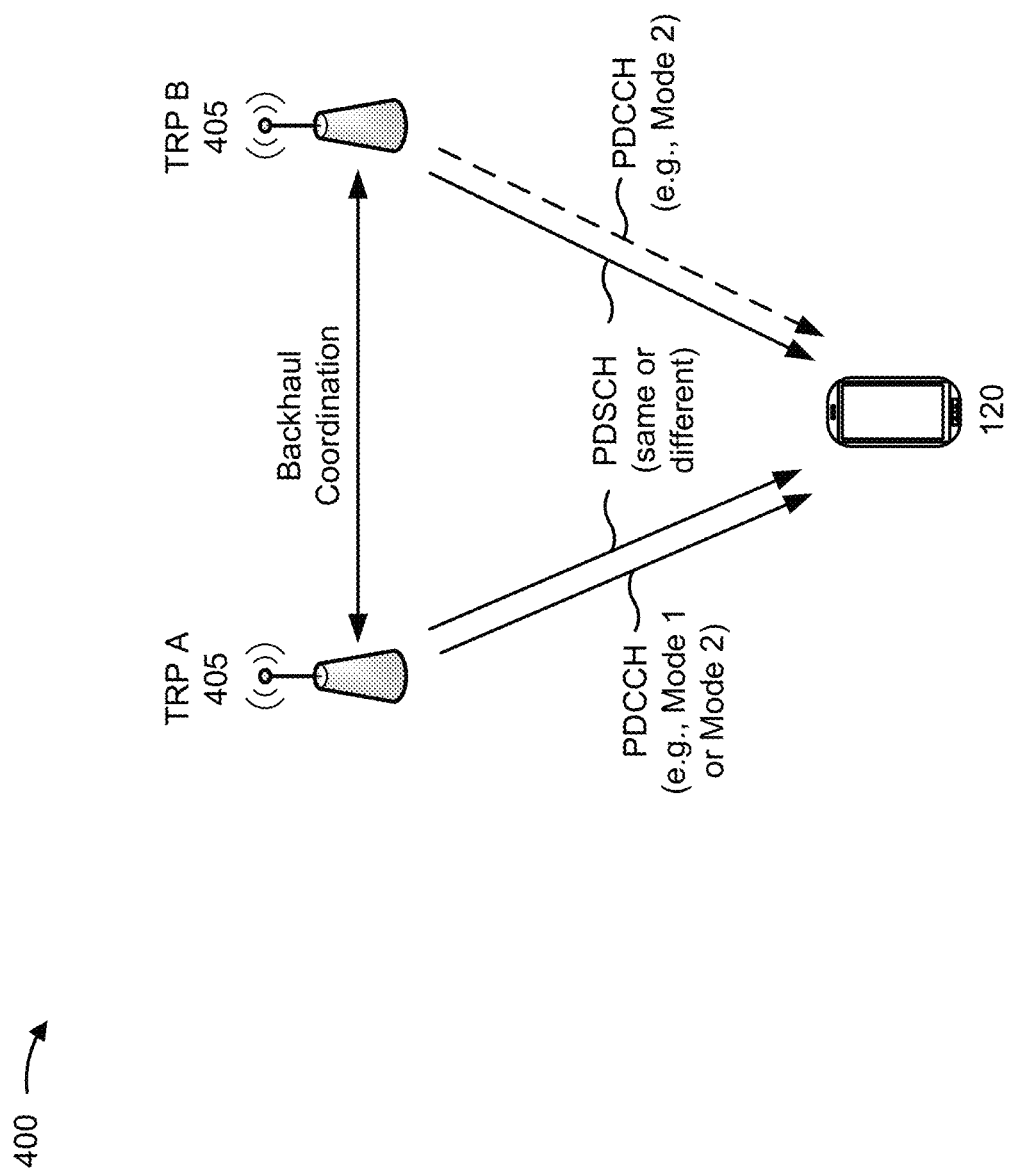
FIG. 4 is a diagram illustrating an example of multi-TRP communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

In some cases, the management network node may be configured to provide a communication network node (e.g., the UE 120 or the base station 110) with a configuration for providing one or more services. In some cases, providing the one or more services may require a transfer of data, such as data associated with a cellular network. For example, base station 110 may need to establish a data session with the UE 120 in order to provide the services. However, at least some of the services may be provided, or may be received, without requiring the transfer of data (e.g., without requiring user plane signaling), or the establishment of a data session. Thus, transferring data in order to provide the services may use a larger amount of time and frequency resources than is necessary, which may cause, or contribute to, an overloading of the network.

Techniques and apparatuses are described herein for configuring an NDWS. In some aspects, the management network node may receive, from a communication network node, a plurality of NDWS configurations. The NDWS may include a positioning service, a radio frequency sensing service, or a timing synchronization service. The management network node may select one of the plurality of NDWS configurations, and transmit, to the communication network node, an indication of the selected NDWS configuration. The management network node may select the NDWS configuration, from the plurality of NDWS configurations, based at least in part on information in a service activation request associated with the NDWS. In some aspects, the management network node may receive a request to modify the NDWS configuration, and may transmit, to the communication network node, a modified NDWS configuration.

As described above, one or more services provided by the communication network node, or received by the communication network node, may not require the transfer of data, or the establishment of a data session. Thus, transferring data in order to provide the services may use a larger amount of time and frequency resources than is necessary, which may cause, or contribute to, an overloading of the network. The NDWS configuration described herein may enable the communication network node to provide one or more services, or receive one or more services, without transferring data, or without establishing a data session. Thus, providing the one or more services in accordance with the NDWS configuration, such as using NDWS reference signals, may reduce the load on the network.

As indicated above, FIG. 4 is provided as an example. Other examples may differ from what is described with respect to FIG. 4.

Figure 5:
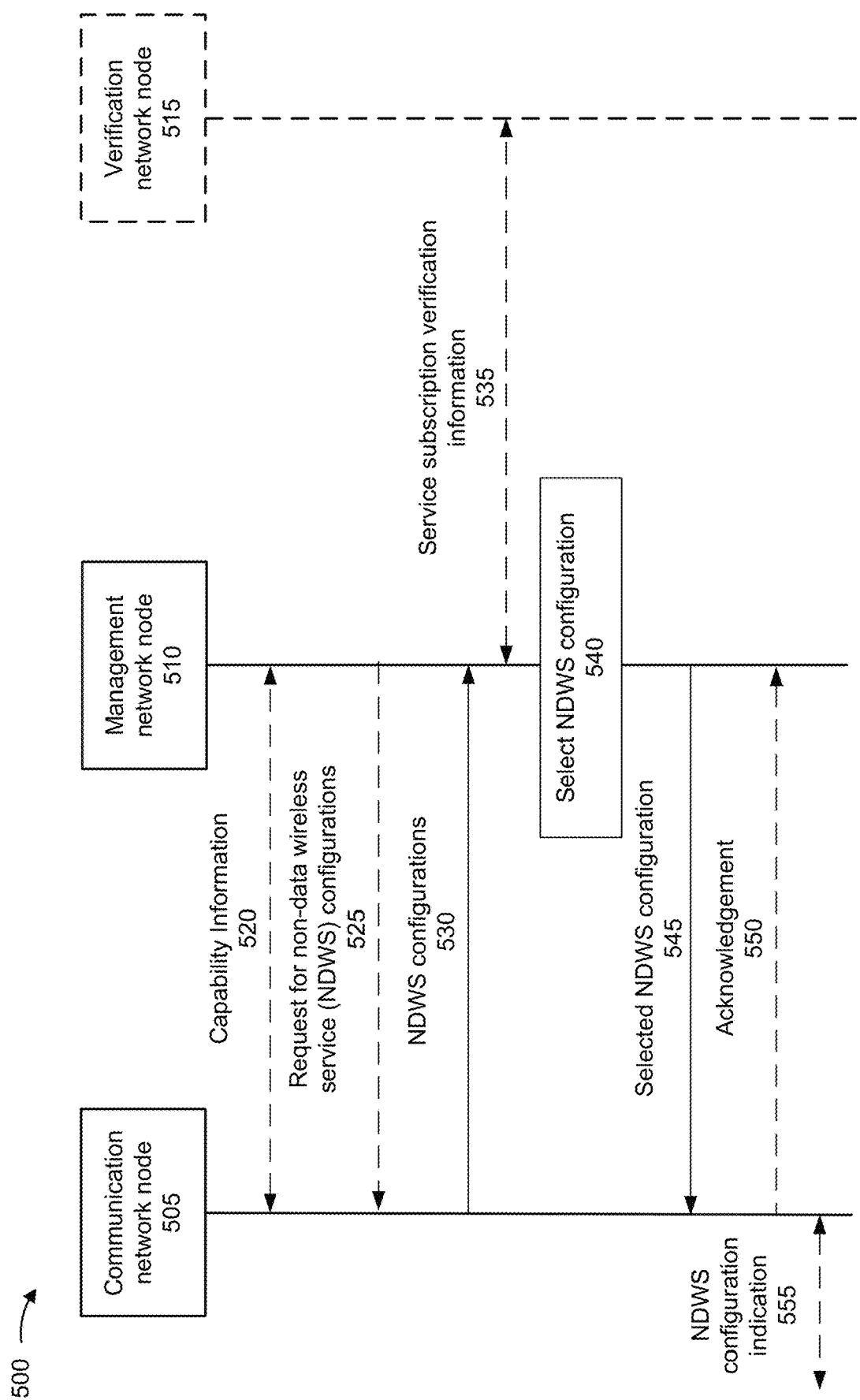
FIG. 5 is a diagram illustrating an example associated with capabilities and configuration for non-data wireless service (NDWS), in accordance with the present disclosure.

FIG. 5 is a diagram illustrating an example 500 of capabilities and configuration for NDWS, in accordance with the present disclosure. A communication network node 505 may communicate with a management network node 510. In some aspects, the communication network node 505 may be a UE, such as the UE 120, or a base station, such as the base station 110. In some aspects, the management network node 510 may be a non-data management function (NDMF). The management network node 510 may communicate with a verification network node 515. In some aspects, the verification network node 515 may be a unified data management (UDM) function.

As described in more detail below, the communication network node 505, when implemented as the base station 110, may be configured to provide service configurations (e.g., NDWS configurations) to the UE 120 and the management network node 510, perform measurements (e.g., beam measurements or cell measurements) and send reports to the UE 120 and management network node 510, and/or communicate (e.g., transmit and receive) non-data reference signals (ND-RSs). The management network node 510, when implemented as the UE 120, may be configured to perform measurements and send reports to the base station 110 and the management network node 510, process measurements received from the base station 110, compute and provide parameters related to the NDWS, and/or communicate ND-RSs. The management network node 510 may be configured to coordinate service configuration and execution with the communication network node 505 (e.g., the UE 120 and/or the base station 110), process measurements received from the communication network node 505, and/or compute and provide parameters related to the NDWS.

As shown in connection with reference number 520, the communication network node 505 and the management network node 510 may communicate capability information. For example, the management network node 510 may transmit a request for the capability information associated with the communication network node 505, and the communication network node 505 may transmit the capability information associated with the communication network node 505. In some aspects, the management network node 510 may transmit an acknowledgement message associated with receiving the capability information.

In some aspects, the communication network node 505 may be the UE 120, and the capability information may indicate whether the UE 120 supports one or more core network features associated with the NDWS, or one or more radio access features associated with the NDWS. For example, the capability information may indicate whether the UE 120 supports location service notifications that allow the UE 120 to deny or accept an external client request to obtain the NDWS service (e.g., the location of the UE 120). In some aspects, the capability information may be received via an access and mobility management function (AMF).

In some aspects, the communication network node 505 may be the UE 120, and the capability information may indicate whether the UE 120 supports one or more radio access features associated with the NDWS. For example, the capability information may indicate whether the UE 120 supports inter-frequency reference signal time difference (RSTD) measurements for observed time difference of arrival (OTDOA) positioning.

In some aspects, the communication network node 505 may be the base station 110, and the capability information may indicate whether the base station 110 supports one or more features associated with the NDWS. For example, the base station 110 may indicate whether the base station 110 supports full-duplex communications (e.g., for RF sensing services) or whether the base station 110 supports on-demand position reference signaling feature (e.g., for positioning services).

As shown in connection with reference number 525, the management network node 510 may transmit, and the communication network node 505 may receive, a request for NDWS configurations. For example, the management network node 510 may transmit, and the base station 110 may receive, a request for service related configurations associated with the NDWS. In some aspects, the communication network node 505 (e.g., the base station 110) may be configured (e.g., by a service management and orchestration entity) with a plurality of NDWS configurations.

In some aspects, the NDWS configuration may enable the communication network node 505 to provide the NDWS without requiring user plane signaling. In some aspects, the NDWS configuration may enable the communication network node 505 to provide the NDWS using signaling that includes only control plane signaling. In some aspects, the NDWS may be a positioning service, a radio frequency sensing service, or a timing synchronization service.

In some aspects, the positioning service may be used to determine a location of a device. For example, the base station 110 may use the positioning service to determine a location of the UE 120.

In some aspects, the radio frequency (RF) sensing service may be used for determining information based at least in part on signals being reflected off objects. An example application for RF sensing may include object detecting and tracking. For example, RF sensing may be used for detecting and tracking objects in an environment (e.g., an indoor factory, a private network, a room, a store, a public park, or a traffic intersection, among other examples), for security (e.g., intruder detection), and/or for in-store sensing (e.g., counting or locating customers). In another example, RF sensing may be used for gesture recognition, such as gesture identification (e.g., hand waving) and/or home appliance control using gestures. In another example, RF sensing may be used for healthcare purposes, such as for remote diagnostics (e.g., sleep monitoring, vitals monitoring, or behavior monitoring, among other examples) and/or fall detection.

In some aspects, the timing synchronization service may be used for ensuring a synchronized and accurate time across a plurality of devices (e.g., UEs 120). For example, devices associated with sensors, actuators, and other machines (e.g., in a factory setup), devices in a home environment associated with audio-video applications, and/or generators in an electrical grid, may be synchronized using the timing synchronization service, among other examples. In some aspects, the devices may be synchronized using a single time reference, or using multiple time references.

As shown in connection with reference number 530, the communication network node 505 may transmit, and the management network node 510 may receive, the NDWS configurations. In some aspects, the communication network node 505 may store, or may be configured to access, a plurality of NDWS configurations. The NDWS configurations may correspond to one or more services that can be provided by the communication network node 505, or that can be received by the communication network node 505, as described above. For example, one or more configurations may correspond to the positioning service, one or more configurations may correspond to the RF sensing service, and one or more configurations may correspond to the timing synchronization service. In some aspects, a configuration may correspond to a combination of the services, or may correspond to a service that is not included in the list of services described above.

As shown in connection with reference number 535, the management network node 510 and the verification network node 515 may communicate service subscription verification information. For example, the verification network node 515 may store, or may otherwise access, information associated with the plurality of NDWS configurations, such as a location where the NDWS services can be provided, or whether the communication network node 505 is required to consent to receiving the NDWS configuration, among other examples.

As shown in connection with reference number 540, the management network node 510 may select an NDWS configuration. For example, the management network node 510 may select an NDWS configuration from the plurality of NDWS configurations received from the communication network node 505. In some aspects, the management network node 510 may receive, from the communication network node 505, a service activation request associated with the NDWS. The service activation request may include information associated with the plurality of NDWS configurations. The management network node may be configured to select the NDWS configuration, from the plurality of NDWS configurations, based at least in part on the information included in the service activation request.

In some aspects, the management network node 510 may select the NDWS configuration, from the plurality of NDWS configurations, based at least in part on the capability information. For example, the management network node 510 may receive capability information associated with the communication network node 505, such as the UE 120 or the base station 110, and may select the NDWS configuration based at least in part on the capability information associated with the UE 120 or the base station 110. In some aspects, the management network node 510 may select the NDWS configuration, from the plurality of NDWS configurations, based at least in part on information received from another device (e.g., an external client) that is not the communication network node 505.

In some aspects, the selected NDWS configuration may indicate a set of time resources and frequency resources for providing the NDWS. In some aspects, the selected NDWS configuration may include an indication of one or more NDWS reference signals. For example, the NDWS configuration may indicate a set of time and frequency resources for communicating the NDWS reference signals.

As shown in connection with reference number 545, the management network node 510 may transmit, and the communication network node 505 may receive, an indication associated with the selected NDWS configuration. For example, the indication may indicate to use the selected NDWS configuration.

In some aspects, transmitting the indication associated with the selected NDWS configuration may include configuring the communication network node 505 (e.g., the base station 110) with the selected NDWS configuration. In some aspects, transmitting the indication associated with the NDWS configuration may include an indication to configure another device with the selected NDWS configuration. For example, the indication may indicate for the base station 110 to provide the selected NDWS configuration to the UE 120. In some aspects, the base station 110 may provide the UE 120 with the selected NDWS configuration via an RRC message (e.g., a unicast RRC message). In some aspects, the base station 110 may broadcast the selected NDWS configuration (e.g., via a broadcast RRC message that is received by the UE 120).

As shown in connection with reference number 550, the communication network node 505 may transmit, and the management network node may receive, an acknowledgement message. The acknowledgement message may indicate that the communication network node 505 will provide one or more services, or receive one or more services, using the selected NDWS configuration.

As shown in connection with reference number 555, the communication network node 505 may communicate the selected NDWS configuration. In some aspects, the communication network node 505 (e.g., the base station 110) may provide the selected NDWS configuration to one or more UEs 120. As described above, the communication network node 505 may communicate one or more NDWS reference signals in accordance with the NDWS configuration.

As described above, one or more services provided by the communication network node 505, or received by the communication network node 505, may not require the transfer of data, or the establishment of a data session. Thus, transferring data in order to provide the services may use a larger amount of time and frequency resources than is necessary, which may cause, or contribute to, an overloading of the network. The NDWS configuration described herein may enable the communication network node 505 to provide one or more services, or receive one or more services, without transferring data (e.g., without using control plane signaling), or without establishing a data session. Thus, providing the one or more services in accordance with the NDWS configuration, such as using NDWS reference signals, may reduce the load on the network.

As indicated above, FIG. 5 is provided as an example. Other examples may differ from what is described with respect to FIG. 5.

Figure 6:
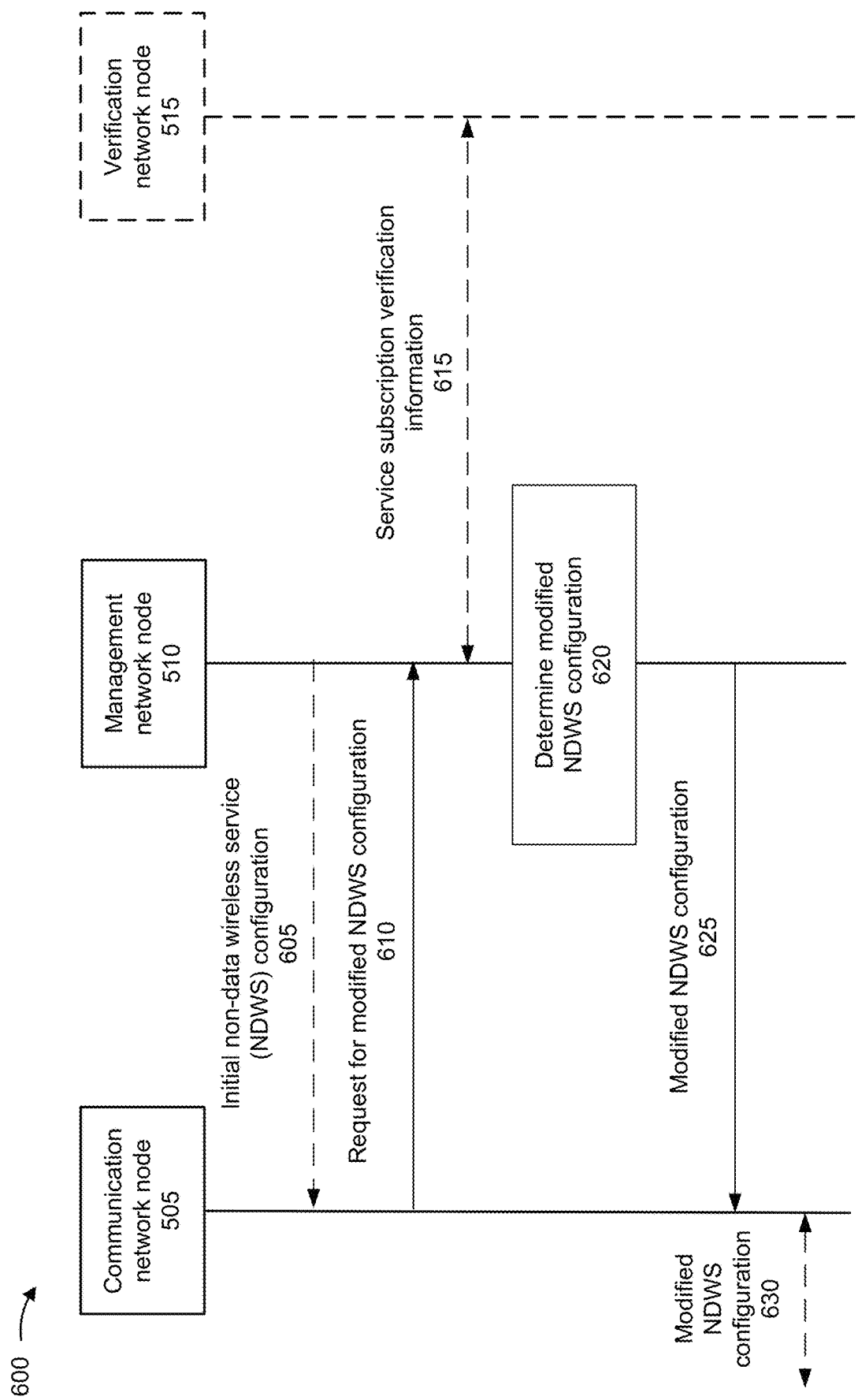
FIG. 6 is a diagram illustrating an example associated with capabilities and configuration for NDWS, in accordance with the present disclosure.

FIG. 6 is a diagram illustrating an example 600 of capabilities and configuration for NDWS. A communication network node 505 may communicate with a management network node 510. In some aspects, the communication network node 505 may be a UE, such as the UE 120, or a base station, such as the base station 110. In some aspects, the management network node 510 may be a non-data management function (NDMF). The management network node 510 may communicate with a verification network node 515. In some aspects, the verification network node 515 may be a unified data management (UDM) function.

As shown in connection with reference number 605, the management network node 510 may transmit, and the communication network node 505 may receive, an initial NDWS configuration. The initial NDWS configuration may be provided in accordance with one or more steps of the example 500 described above in connection with FIG. 5. Additionally, or alternatively, the communication network node 505 may already be configured with the initial NDWS configuration, such as through a configuration by another device, or an initial configuration (e.g., pre-configuration) of the communication network node 505.

In some aspects, the NDWS configuration (e.g., the initial NDWS configuration) may enable the communication network node 505 to provide the NDWS without requiring user plane signaling. In some aspects, the NDWS configuration may enable the communication network node 505 to provide the NDWS using signaling that includes only control plane signaling. In some aspects, the NDWS may be a positioning service, a radio frequency sensing service, or a timing synchronization service. In some aspects, the management network node 510 may transmit the initial NDWS configuration in accordance with one or more of the steps described above in connection with FIG. 5.

As shown in connection with reference number 610, the communication network node 505 may transmit, and the management network node 510 may receive, a request for a modified NDWS configuration. In some aspects, the request for the modified NDWS configuration may include information for modifying the NDWS configuration. For example, the information for modifying the NDWS configuration may include a preferred configuration, a quality of service (QoS) indication, and/or a cell measurement. In some aspects, the request for the modified NDWS configuration may be received from another device (e.g., an external client) that is not the communication network node 505.

As shown in connection with reference number 615, the management network node 510 and the verification network node 515 may communicate service subscription verification information. As described above in connection with reference number 535, the verification network node 515 may store, or may otherwise access, information associated with the plurality of NDWS configurations, such as a location where the NDWS services can be provided, or whether the communication network node 505 is required to consent to receiving the NDWS configuration, among other examples. Additionally, or alternatively, the verification network node 515 may store, or may otherwise access, information associated with modifying the NDWS configuration. For example, the verification network node 515 may store, or access, information that indicates whether or not the NDWS configuration can be modified, or one or more rules associated with modifying the NDWS configuration. The verification network node 515 may transmit, to the management network node 510, an indication associated with modifying the NDWS configuration.

As shown in connection with reference number 620, the management network node 510 may determine the modified NDWS configuration. In some aspects, the management network node 510 may determine the NDWS configuration based at least in part on the information received from the communication network node 505. In some aspects, the communication network node 505 may transmit a QoS indication, or QoS requirement, associated with the NDWS, and the management network node 510 may determine the modified NDWS configuration based at least in part on the QoS indication, or the QoS requirement, of the NDWS. In some aspects, the communication network node 505 may transmit a preferred configuration (e.g., based at least in part on the QoS) for the NDWS, and the management network node 510 may determine the modified NDWS configuration based at least in part on the preferred configuration. In some aspects, the communication network node 505 may transmit a cell measurement, or a TRP measurement, associated with the NDWS, and the management network node 510 may determine the modified NDWS configuration, such as a new TRP, or a new cell, for the NDWS, based at least in part on the received measurements.

In some aspects, the management network node 510 may determine the modified configuration without any external input, such as the information received from the communication network node 505. In some aspects, another device may determine the modified NDWS configuration, and may transmit the modified NDWS configuration to the management network node 510.

As shown in connection with reference number 625, the management network node 510 may transmit, and the communication network node 505 may receive, the modified NDWS configuration. The modified NDWS configuration may be based at least in part on the request for the modified NDWS configuration.

As shown in connection with reference number 630, the communication network node 505 may communicate information associated with the modified NDWS configuration. In some aspects, the communication network node 505 (e.g., the base station 110) may provide the modified NDWS configuration to one or more UEs 120. As described above, the communication network node 505 may communicate one or more NDWS reference signals in accordance with the modified NDWS configuration.

As described above, one or more services provided by the communication network node 505, or received by the communication network node 505, may not require the transfer of data, or the establishment of a data session. Thus, transferring data in order to provide the services may use a larger amount of time and frequency resources than is necessary, which may cause, or contribute to, an overloading of the network. The NDWS configuration (e.g., the modified NDWS configuration) may enable the communication network node 505 to provide one or more services, or receive one or more services, without transferring data (e.g., without using control plane signaling), or without establishing a data session. Thus, providing the one or more services in accordance with the NDWS configuration, such as using NDWS reference signals, may reduce the load on the network.

As indicated above, FIG. 6 is provided as an example. Other examples may differ from what is described with respect to FIG. 6.

Figure 7:
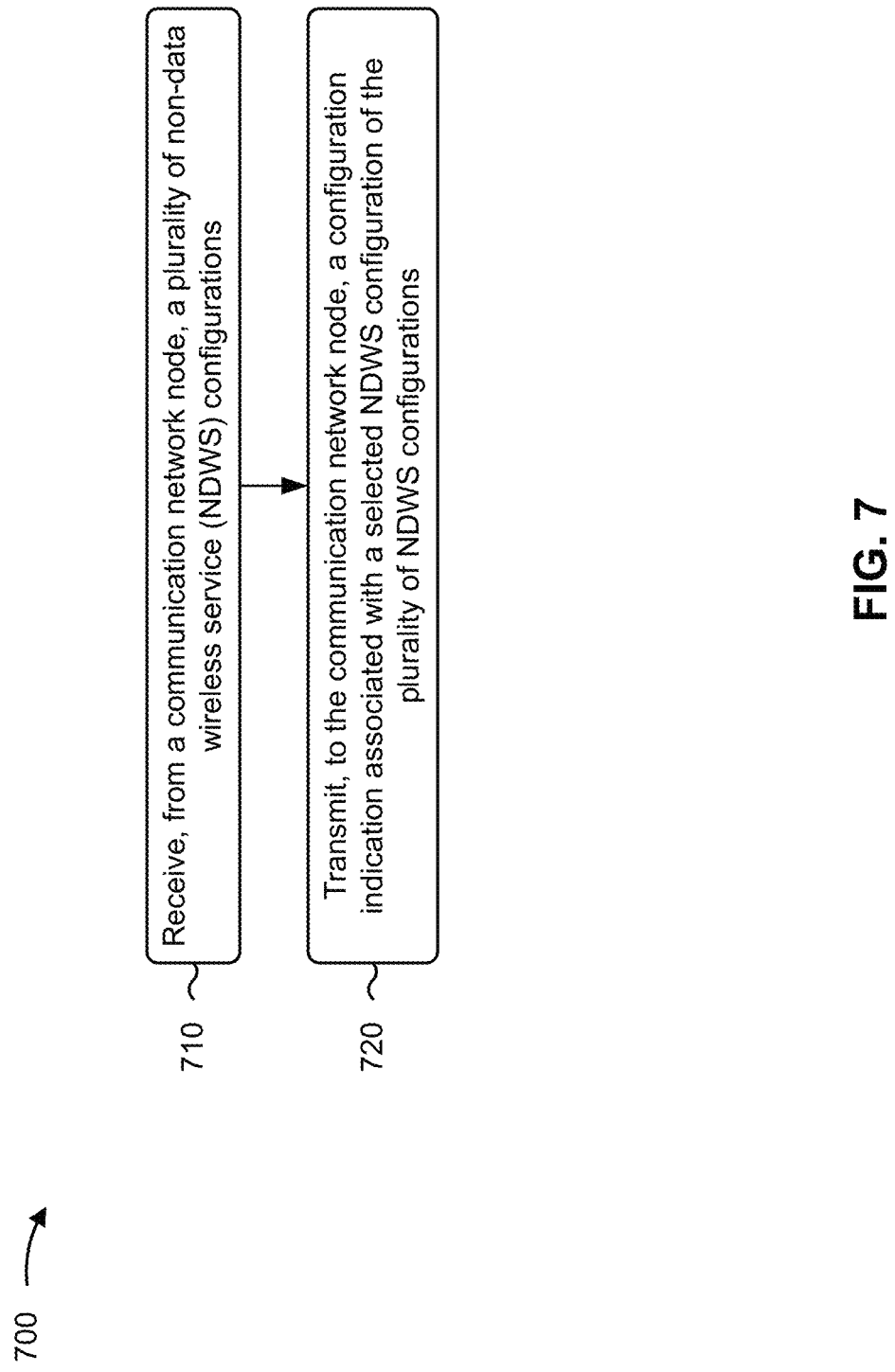
FIG. 7 is a diagram illustrating an example process associated with capabilities and configuration for NDWS, in accordance with the present disclosure.

FIG. 7 is a diagram illustrating an example process 700 performed, for example, by a management network node, in accordance with the present disclosure. Example process 700 is an example where the management network node (e.g., management network node 510) performs operations associated with capabilities and configuration for non-data wireless services.

As shown in FIG. 7, in some aspects, process 700 may include receiving, from a communication network node, a plurality of NDWS configurations (block 710). For example, the management network node (e.g., using communication component 860) may receive, from a communication network node, a plurality of NDWS configurations, as described above.

As further shown in FIG. 7, in some aspects, process 700 may include transmitting, to the communication network node, a configuration indication associated with a selected NDWS configuration of the plurality of NDWS configurations (block 720). For example, the management network node (e.g., using communication component 860) may transmit, to the communication network node, a configuration indication associated with a selected NDWS configuration of the plurality of NDWS configurations, as described above.

Process 700 may include additional aspects, such as any single aspect or any combination of aspects described below and/or in connection with one or more other processes described elsewhere herein.

In a first aspect, process 700 includes receiving a service activation request associated with the NDWS, and selecting the NDWS configuration, from the plurality of NDWS configurations, based at least in part on information included in the service activation request.

In a second aspect, alone or in combination with the first aspect, the configuration indication indicates to use the selected NDWS configuration.

In a third aspect, alone or in combination with one or more of the first and second aspects, the selected NDWS configuration indicates a set of time resources and frequency resources for providing the NDWS.

In a fourth aspect, alone or in combination with one or more of the first through third aspects, process 700 includes receiving capability information associated with the communication network node, and selecting the NDWS configuration, from the plurality of NDWS configurations, based at least in part on the capability information associated with the communication network node.

In a fifth aspect, alone or in combination with one or more of the first through fourth aspects, the communication network node is a UE, and the capability information indicates whether the UE supports one or more features associated with the NDWS.

In a sixth aspect, alone or in combination with one or more of the first through fifth aspects, the capability information is received via the communication network node, or via an access and mobility management function.

In a seventh aspect, alone or in combination with one or more of the first through sixth aspects, the communication network node is a base station, and the capability information indicates whether the base station supports one or more features associated with the NDWS.

In an eighth aspect, alone or in combination with one or more of the first through seventh aspects, the selected NDWS configuration enables the NDWS to be provided without requiring user plane signaling.

In a ninth aspect, alone or in combination with one or more of the first through eighth aspects, the selected NDWS configuration enables the NDWS to be provided using signaling that includes only control plane signaling.

In a tenth aspect, alone or in combination with one or more of the first through ninth aspects, the NDWS is a positioning service, a radio frequency sensing service, or a timing synchronization service.

In an eleventh aspect, alone or in combination with one or more of the first through tenth aspects, the management network node is a non-data management function.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
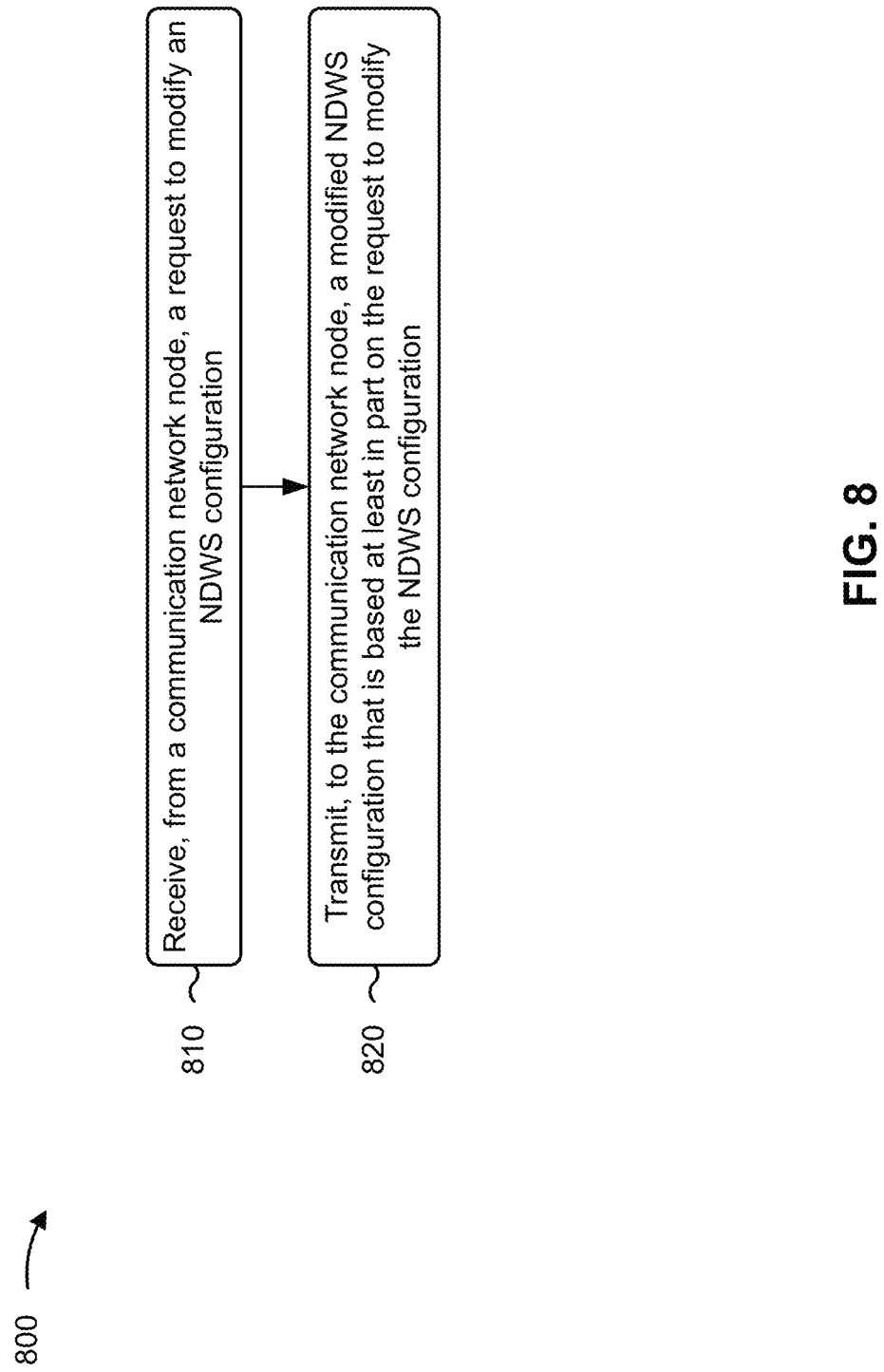
FIG. 8 is a diagram illustrating an example process associated with capabilities and configuration for NDWS, in accordance with the present disclosure.

FIG. 8 is a diagram illustrating an example process 800 performed, for example, by a management network node, in accordance with the present disclosure. Example process 800 is an example where the management network node (e.g., management network node 510) performs operations associated with capabilities and configuration for non-data wireless services.

As shown in FIG. 8, in some aspects, process 800 may include receiving, from a communication network node, a request to modify an NDWS configuration (block 810). For example, the management network node (e.g., using communication component 860) may receive, from a communication network node, a request to modify an NDWS configuration, as described above.

As further shown in FIG. 8, in some aspects, process 800 may include transmitting, to the communication network node, a modified NDWS configuration that is based at least in part on the request to modify the NDWS configuration (block 820). For example, the management network node (e.g., using communication component 860) may transmit, to the communication network node, a modified NDWS configuration that is based at least in part on the request to modify the NDWS configuration, as described above.

Process 800 may include additional aspects, such as any single aspect or any combination of aspects described below and/or in connection with one or more other processes described elsewhere herein.

In a first aspect, the request to modify the NDWS configuration includes information for modifying the NDWS configuration.

In a second aspect, alone or in combination with the first aspect, the information for modifying the NDWS configuration includes a preferred configuration.

In a third aspect, alone or in combination with one or more of the first and second aspects, the information for modifying the NDWS configuration includes a quality of service indication.

In a fourth aspect, alone or in combination with one or more of the first through third aspects, the information for modifying the NDWS configuration includes a cell measurement.

In a fifth aspect, alone or in combination with one or more of the first through fourth aspects, the NDWS is a positioning service, a radio frequency sensing service, or a timing synchronization service.

In a sixth aspect, alone or in combination with one or more of the first through fifth aspects, the management network node is a non-data management function.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
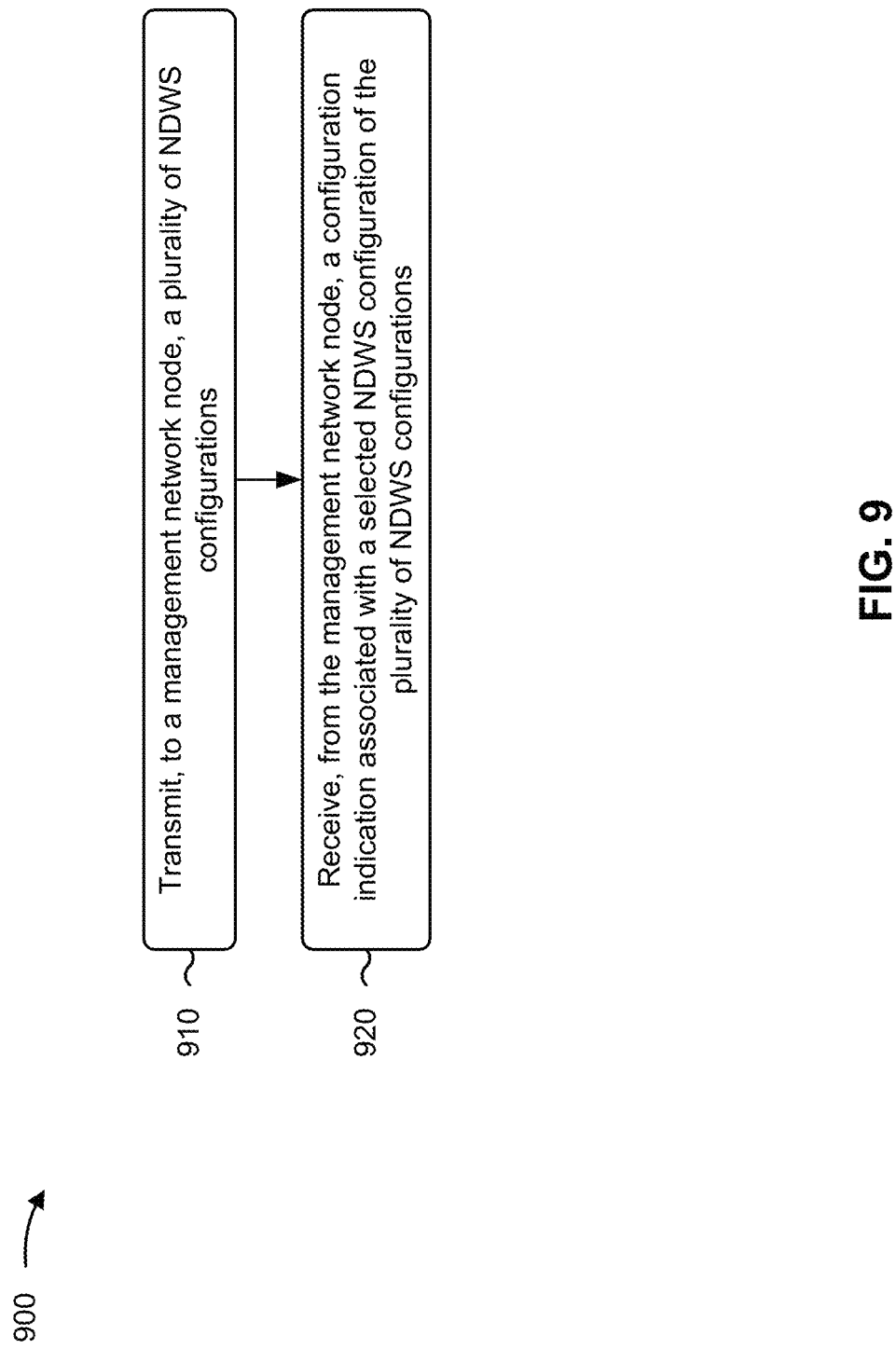
FIG. 9 is a diagram illustrating an example process associated with capabilities and configuration for NDWS, in accordance with the present disclosure.

FIG. 9 is a diagram illustrating an example process 900 performed, for example, by a communication network node, in accordance with the present disclosure. Example process 900 is an example where the communication network node (e.g., communication network node 505) performs operations associated with capabilities and configuration for non-data wireless services.

As shown in FIG. 9, in some aspects, process 900 may include transmitting, to a management network node, a plurality of NDWS configurations (block 910). For example, the communication network node (e.g., using communication manager 140 and/or transmission component 1204, depicted in FIG. 12) may transmit, to a management network node, a plurality of NDWS configurations, as described above.

As further shown in FIG. 9, in some aspects, process 900 may include receiving, from the management network node, a configuration indication associated with a selected NDWS configuration of the plurality of NDWS configurations (block 920). For example, the communication network node (e.g., using communication manager 140 and/or reception component 1202, depicted in FIG. 12) may receive, from the management network node, a configuration indication associated with a selected NDWS configuration of the plurality of NDWS configurations, as described above.

Process 900 may include additional aspects, such as any single aspect or any combination of aspects described below and/or in connection with one or more other processes described elsewhere herein.

In a first aspect, the configuration indication indicates to use the selected NDWS configuration.

In a second aspect, alone or in combination with the first aspect, the selected NDWS configuration indicates a set of time resources and frequency resources for providing the NDWS.

In a third aspect, alone or in combination with one or more of the first and second aspects, process 900 includes transmitting capability information associated with the communication network node.

In a fourth aspect, alone or in combination with one or more of the first through third aspects, the communication network node is a UE, and the capability information indicates whether the UE supports one or more core network features associated with the NDWS, or one or more radio access features associated with the NDWS.

In a fifth aspect, alone or in combination with one or more of the first through fourth aspects, the communication network node is a base station, and the capability information indicates whether the base station supports one or more features associated with the NDWS.

In a sixth aspect, alone or in combination with one or more of the first through fifth aspects, process 900 includes transmitting an indication of the selected NDWS configuration via a radio resource control (RRC) message, wherein the communication network node is a base station, and wherein the RRC message is a broadcast RRC message or a unicast RRC message.

In a seventh aspect, alone or in combination with one or more of the first through sixth aspects, process 900 includes receiving an indication of the selected NDWS configuration via an RRC message, wherein the communication network node is a UE, and wherein the RRC message is a broadcast RRC message or a unicast RRC message.

In an eighth aspect, alone or in combination with one or more of the first through seventh aspects, the selected NDWS configuration enables the NDWS to be provided without requiring user plane signaling.

In a ninth aspect, alone or in combination with one or more of the first through eighth aspects, the selected NDWS configuration enables the NDWS to be provided using signaling that includes only control plane signaling.

In a tenth aspect, alone or in combination with one or more of the first through ninth aspects, the NDWS is a positioning service, a radio frequency sensing service, or a timing synchronization service.

In an eleventh aspect, alone or in combination with one or more of the first through tenth aspects, the management network node is a non-data management function.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
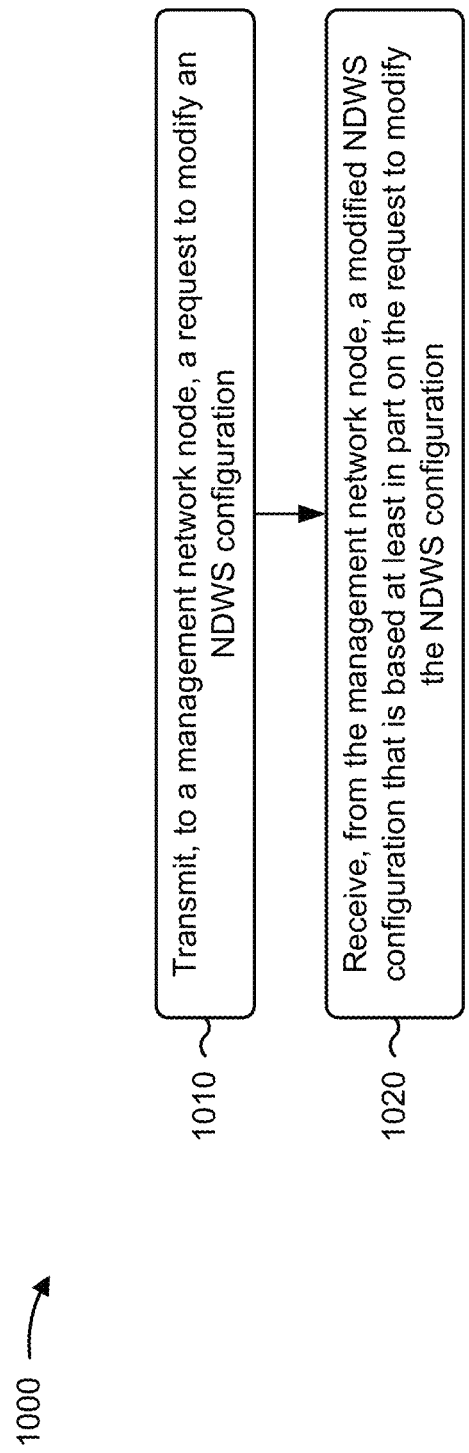
FIG. 10 is a diagram illustrating an example process associated with capabilities and configuration for NDWS, in accordance with the present disclosure.

FIG. 10 is a diagram illustrating an example process 1000 performed, for example, by a communication network node, in accordance with the present disclosure. Example process 1000 is an example where the communication network node (e.g., communication network node 505) performs operations associated with capabilities and configuration for non-data wireless services.

As shown in FIG. 10, in some aspects, process 1000 may include transmitting, to a management network node, a request to modify an NDWS configuration (block 1010). For example, the communication network node (e.g., using communication manager 140 and/or transmission component 1204, depicted in FIG. 12) may transmit, to a management network node, a request to modify an NDWS configuration, as described above.

As further shown in FIG. 10, in some aspects, process 1000 may include receiving, from the management network node, a modified NDWS configuration that is based at least in part on the request to modify the NDWS configuration (block 1020). For example, the communication network node (e.g., using communication manager 140 and/or reception component 1202, depicted in FIG. 12) may receive, from the management network node, a modified NDWS configuration that is based at least in part on the request to modify the NDWS configuration, as described above.

Process 1000 may include additional aspects, such as any single aspect or any combination of aspects described below and/or in connection with one or more other processes described elsewhere herein.

In a first aspect, the request to modify the NDWS configuration includes information for modifying the NDWS configuration.

In a second aspect, alone or in combination with the first aspect, the information for modifying the NDWS configuration includes a preferred configuration.

In a third aspect, alone or in combination with one or more of the first and second aspects, the information for modifying the NDWS configuration includes a quality of service indication.

In a fourth aspect, alone or in combination with one or more of the first through third aspects, the information for modifying the NDWS configuration includes a cell measurement.

In a fifth aspect, alone or in combination with one or more of the first through fourth aspects, the NDWS is a positioning service, a radio frequency sensing service, or a timing synchronization service.

In a sixth aspect, alone or in combination with one or more of the first through fifth aspects, the management network node is a non-data management function.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
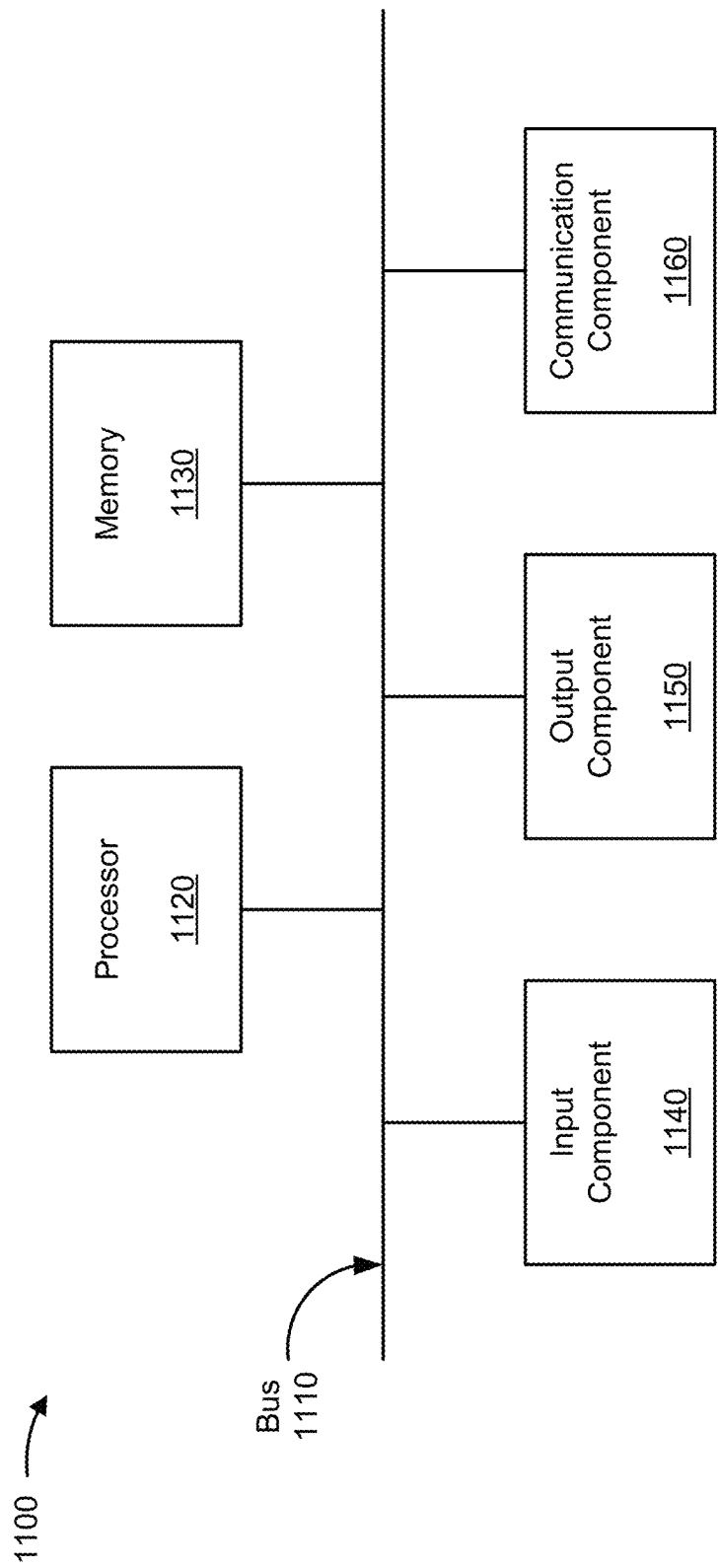
FIG. 11 is a diagram of an example apparatus for wireless communication, in accordance with the present disclosure.

FIG. 11 is a diagram of example components of a device 1100, which may correspond to the management network node 510. In some implementations, the management network node 510 may include one or more devices 1100 and/or one or more components of device 1100. As shown in FIG. 11, device 1100 may include a bus 1110, a processor 1120, a memory 1130, an input component 1140, an output component 1150, and a communication component 1160.

Bus 1110 includes one or more components that enable wired and/or wireless communication among the components of device 1100. Bus 1110 may couple together two or more components of FIG. 11, such as via operative coupling, communicative coupling, electronic coupling, and/or electric coupling. Processor 1120 includes a central processing unit, a graphics processing unit, a microprocessor, a controller, a microcontroller, a digital signal processor, a field-programmable gate array, an application-specific integrated circuit, and/or another type of processing component. Processor 1120 is implemented in hardware, firmware, or a combination of hardware and software. In some implementations, processor 1120 includes one or more processors capable of being programmed to perform one or more operations or processes described elsewhere herein.

Memory 1130 includes volatile and/or nonvolatile memory. For example, memory 1130 may include random access memory (RAM), read only memory (ROM), a hard disk drive, and/or another type of memory (e.g., a flash memory, a magnetic memory, and/or an optical memory). Memory 1130 may include internal memory (e.g., RAM, ROM, or a hard disk drive) and/or removable memory (e.g., removable via a universal serial bus connection). Memory 1130 may be a non-transitory computer-readable medium. Memory 1130 stores information, instructions, and/or software (e.g., one or more software applications) related to the operation of device 1100. In some implementations, memory 1130 includes one or more memories that are coupled to one or more processors (e.g., processor 1120), such as via bus 1110.

Input component 1140 enables device 1100 to receive input, such as user input and/or sensed input. For example, input component 1140 may include a touch screen, a keyboard, a keypad, a mouse, a button, a microphone, a switch, a sensor, a global positioning system sensor, an accelerometer, a gyroscope, and/or an actuator. Output component 1150 enables device 1100 to provide output, such as via a display, a speaker, and/or a light-emitting diode. Communication component 1160 enables device 1100 to communicate with other devices via a wired connection and/or a wireless connection. For example, communication component 1160 may include a receiver, a transmitter, a transceiver, a modem, a network interface card, and/or an antenna.

Device 1100 may perform one or more operations or processes described herein. For example, a non-transitory computer-readable medium (e.g., memory 1130) may store a set of instructions (e.g., one or more instructions or code) for execution by processor 1120. Processor 1120 may execute the set of instructions to perform one or more operations or processes described herein. In some implementations, execution of the set of instructions, by one or more processors 1120, causes the one or more processors 1120 and/or the device 1100 to perform one or more operations or processes described herein. In some implementations, hardwired circuitry is used instead of or in combination with the instructions to perform one or more operations or processes described herein. Additionally, or alternatively, processor 1120 may be configured to perform one or more operations or processes described herein. Thus, implementations described herein are not limited to any specific combination of hardware circuitry and software.

In some aspects, the device 1100 may be configured to perform one or more of the steps of the process 700, such as one or more of the steps described above in connection with FIG. 7. Additionally, or alternatively, the device 1100 may be configured to perform one or more of the steps of the process 800, such as one or more of the steps described above in connection with FIG. 8.

The number and arrangement of components shown in FIG. 11 are provided as an example. Device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

Figure 12:
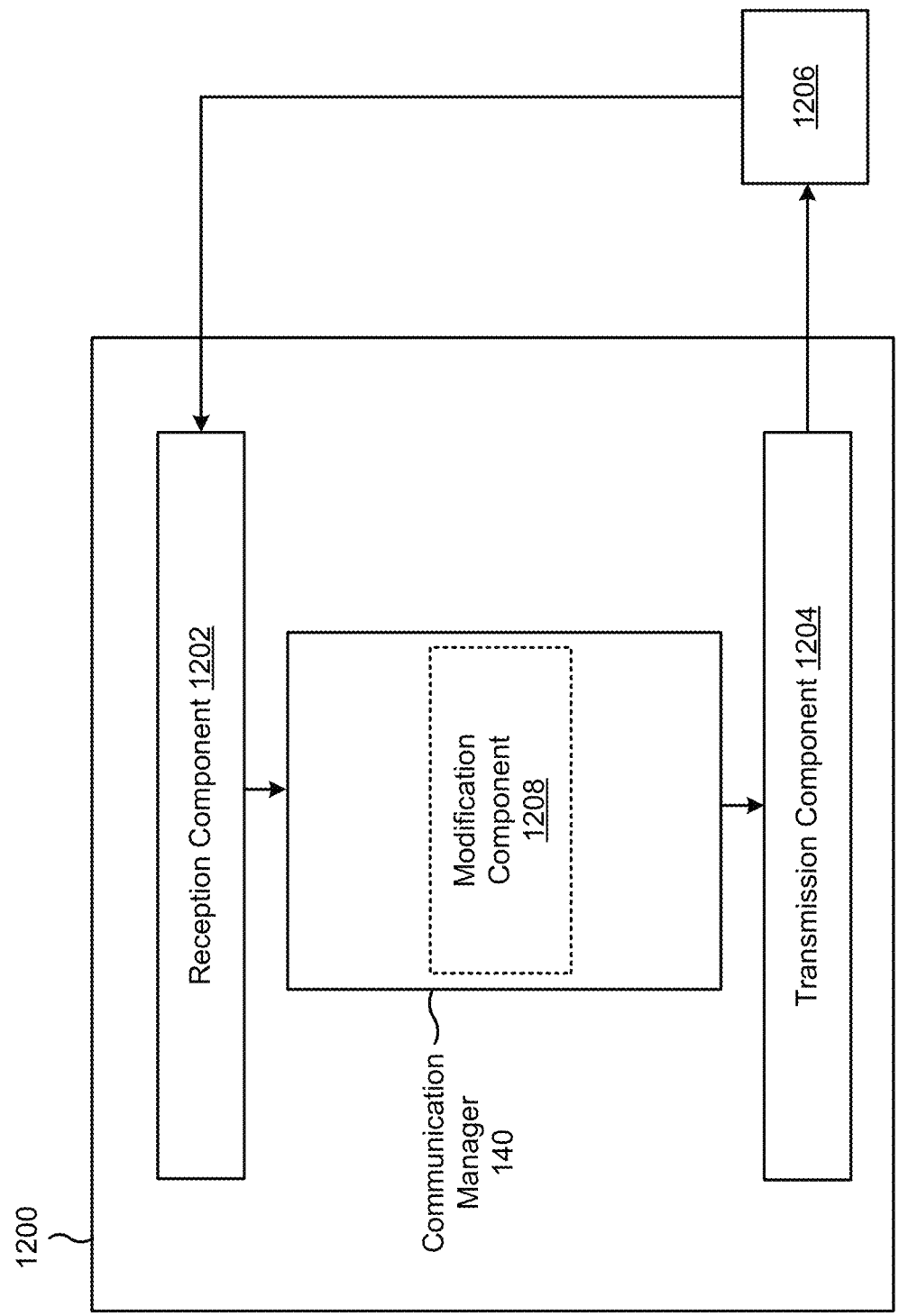
FIG. 12 is a diagram of an example apparatus for wireless communication, in accordance with the present disclosure.

FIG. 12 is a diagram of an example apparatus 1200 for wireless communication. The apparatus 1200 may be a communication network node, or a communication network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a modification component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the communication network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the communication network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the communication network node described in connection with FIG. 2. In some aspects, the transmission component 1204 may be co-located with the reception component 1202 in a transceiver.

The transmission component 1204 may transmit, to a management network node, a plurality of NDWS configurations. The reception component 1202 may receive, from the management network node, a configuration indication associated with a selected NDWS configuration of the plurality of NDWS configurations.

The transmission component 1204 may transmit capability information associated with the communication network node.

The transmission component 1204 may transmit an indication of the selected NDWS configuration via an RRC message, wherein the communication network node is a base station, and wherein the RRC message is a broadcast RRC message or a unicast RRC message.

The reception component 1202 may receive an indication of the selected NDWS configuration via an RRC message, wherein the communication network node is a user equipment, and wherein the RRC message is a broadcast RRC message or a unicast RRC message.

The modification component 1208 may transmit, to a management network node, a request to modify an NDWS configuration. The reception component 1202 may receive, from the management network node, a modified NDWS configuration that is based at least in part on the request to modify the NDWS configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a management network node, comprising: receiving, from a communication network node, a plurality of non-data wireless service (NDWS) configurations; and transmitting, to the communication network node, a configuration indication associated with a selected NDWS configuration of the plurality of NDWS configurations.

Aspect 2: The method of Aspect 1, further comprising: receiving a service activation request associated with the NDWS; and selecting the NDWS configuration, from the plurality of NDWS configurations, based at least in part on information included in the service activation request.

Aspect 3: The method of any of Aspects 1-2, wherein the configuration indication indicates to use the selected NDWS configuration.

Aspect 4: The method of any of Aspects 1-3, wherein the selected NDWS configuration indicates a set of time resources and frequency resources for providing the NDWS.

Aspect 5: The method of any of Aspects 1-4, further comprising: receiving capability information associated with the communication network node; and selecting the NDWS configuration, from the plurality of NDWS configurations, based at least in part on the capability information associated with the communication network node.

Aspect 6: The method of Aspect 5, wherein the communication network node is a user equipment (UE), and wherein the capability information indicates whether the UE supports one or more features associated with the NDWS.

Aspect 7: The method of Aspect 6, wherein the capability information is received via the communication network node, or via an access and mobility management function.

Aspect 8: The method of Aspect 5, wherein the communication network node is a base station, and wherein the capability information indicates whether the base station supports one or more features associated with the NDWS.

Aspect 9: The method of any of Aspects 1-8, wherein the selected NDWS configuration enables the NDWS to be provided without requiring user plane signaling.

Aspect 10: The method of any of Aspects 1-9, wherein the selected NDWS configuration enables the NDWS to be provided using signaling that includes only control plane signaling.

Aspect 11: The method of any of Aspects 1-10, wherein the NDWS is a positioning service, a radio frequency sensing service, or a timing synchronization service.

Aspect 12: The method of any of Aspects 1-11, wherein the management network node is a non-data management function.

Aspect 13: A method of wireless communication performed by a management network node, comprising: receiving, from a communication network node, a request to modify a non-data wireless service (NDWS) configuration; and transmitting, to the communication network node, a modified NDWS configuration that is based at least in part on the request to modify the NDWS configuration.

Aspect 14: The method of Aspect 13, wherein the request to modify the NDWS configuration includes information for modifying the NDWS configuration.

Aspect 15: The method of Aspect 14, wherein the information for modifying the NDWS configuration includes a preferred configuration.

Aspect 16: The method of Aspect 14, wherein the information for modifying the NDWS configuration includes a quality of service indication.

Aspect 17: The method of Aspect 14, wherein the information for modifying the NDWS configuration includes a cell measurement.

Aspect 18: The method of any of Aspects 13-17, wherein the NDWS is a positioning service, a radio frequency sensing service, or a timing synchronization service.

Aspect 19: The method of any of Aspects 13-18, wherein the management network node is a non-data management function.

Aspect 20: A method of wireless communication performed by a communication network node, comprising: transmitting, to a management network node, a plurality of non-data wireless service (NDWS) configurations; and receiving, from the management network node, a configuration indication associated with a selected NDWS configuration of the plurality of NDWS configurations.

Aspect 21: The method of Aspect 20, wherein the configuration indication indicates to use the selected NDWS configuration.

Aspect 22: The method of any of Aspects 20-21, wherein the selected NDWS configuration indicates a set of time resources and frequency resources for providing the NDWS.

Aspect 23: The method of any of Aspects 20-22, further comprising transmitting capability information associated with the communication network node.

Aspect 24: The method of Aspect 23, wherein the communication network node is a user equipment (UE), and wherein the capability information indicates whether the UE supports one or more core network features associated with the NDWS, or one or more radio access features associated with the NDWS.

Aspect 25: The method of Aspect 23, wherein the communication network node is a base station, and wherein the capability information indicates whether the base station supports one or more features associated with the NDWS.

Aspect 26: The method of any of Aspects 20-25, further comprising transmitting an indication of the selected NDWS configuration via a radio resource control (RRC) message, wherein the communication network node is a base station, and wherein the RRC message is a broadcast RRC message or a unicast RRC message.

Aspect 27: The method of any of Aspects 20-26, further comprising receiving an indication of the selected NDWS configuration via a radio resource control (RRC) message, wherein the communication network node is a user equipment, and wherein the RRC message is a broadcast RRC message or a unicast RRC message.

Aspect 28: The method of any of Aspects 20-27, wherein the selected NDWS configuration enables the NDWS to be provided without requiring user plane signaling.

Aspect 29: The method of any of Aspects 20-28, wherein the selected NDWS configuration enables the NDWS to be provided using signaling that includes only control plane signaling.

Aspect 30: The method of any of Aspects 20-29, wherein the NDWS is a positioning service, a radio frequency sensing service, or a timing synchronization service.

Aspect 31: The method of any of Aspects 20-30, wherein the management network node is a non-data management function.

Aspect 32: A method of wireless communication performed by a communication network node, comprising: transmitting, to a management network node, a request to modify a non-data wireless service (NDWS) configuration; and receiving, from the management network node, a modified NDWS configuration that is based at least in part on the request to modify the NDWS configuration.

Aspect 33: The method of Aspect 32, wherein the request to modify the NDWS configuration includes information for modifying the NDWS configuration.

Aspect 34: The method of Aspect 33, wherein the information for modifying the NDWS configuration includes a preferred configuration.

Aspect 35: The method of Aspect 33, wherein the information for modifying the NDWS configuration includes a quality of service indication.

Aspect 36: The method of Aspect 33, wherein the information for modifying the NDWS configuration includes a cell measurement.

Aspect 37: The method of any of Aspects 32-36, wherein the NDWS is a positioning service, a radio frequency sensing service, or a timing synchronization service.

Aspect 38: The method of any of Aspects 32-37, wherein the management network node is a non-data management function.

Aspect 39: An apparatus for wireless communication at a device, comprising a processor; memory coupled with the processor; and instructions stored in the memory and executable by the processor to cause the apparatus to perform the method of one or more of Aspects 1-13.

Aspect 40: A device for wireless communication, comprising a memory and one or more processors coupled to the memory, the one or more processors configured to perform the method of one or more of Aspects 1-13.

Aspect 41: An apparatus for wireless communication, comprising at least one means for performing the method of one or more of Aspects 1-13.

Aspect 42: A non-transitory computer-readable medium storing code for wireless communication, the code comprising instructions executable by a processor to perform the method of one or more of Aspects 1-13.

Aspect 43: A non-transitory computer-readable medium storing a set of instructions for wireless communication, the set of instructions comprising one or more instructions that, when executed by one or more processors of a device, cause the device to perform the method of one or more of Aspects 1-13.

Aspect 44: An apparatus for wireless communication at a device, comprising a processor; memory coupled with the processor; and instructions stored in the memory and executable by the processor to cause the apparatus to perform the method of one or more of Aspects 14-19.

Aspect 45: A device for wireless communication, comprising a memory and one or more processors coupled to the memory, the one or more processors configured to perform the method of one or more of Aspects 14-19.

Aspect 46: An apparatus for wireless communication, comprising at least one means for performing the method of one or more of Aspects 14-19.

Aspect 47: A non-transitory computer-readable medium storing code for wireless communication, the code comprising instructions executable by a processor to perform the method of one or more of Aspects 14-19.

Aspect 48: A non-transitory computer-readable medium storing a set of instructions for wireless communication, the set of instructions comprising one or more instructions that, when executed by one or more processors of a device, cause the device to perform the method of one or more of Aspects 14-19.

Aspect 49: An apparatus for wireless communication at a device, comprising a processor; memory coupled with the processor; and instructions stored in the memory and executable by the processor to cause the apparatus to perform the method of one or more of Aspects 20-31.

Aspect 50: A device for wireless communication, comprising a memory and one or more processors coupled to the memory, the one or more processors configured to perform the method of one or more of Aspects 20-31.

Aspect 51: An apparatus for wireless communication, comprising at least one means for performing the method of one or more of Aspects 20-31.

Aspect 52: A non-transitory computer-readable medium storing code for wireless communication, the code comprising instructions executable by a processor to perform the method of one or more of Aspects 20-31.

Aspect 53: A non-transitory computer-readable medium storing a set of instructions for wireless communication, the set of instructions comprising one or more instructions that, when executed by one or more processors of a device, cause the device to perform the method of one or more of Aspects 20-31.

Aspect 54: An apparatus for wireless communication at a device, comprising a processor; memory coupled with the processor; and instructions stored in the memory and executable by the processor to cause the apparatus to perform the method of one or more of Aspects 32-38.

Aspect 55: A device for wireless communication, comprising a memory and one or more processors coupled to the memory, the one or more processors configured to perform the method of one or more of Aspects 32-38.

Aspect 56: An apparatus for wireless communication, comprising at least one means for performing the method of one or more of Aspects 32-38.

Aspect 57: A non-transitory computer-readable medium storing code for wireless communication, the code comprising instructions executable by a processor to perform the method of one or more of Aspects 32-38.

Aspect 58: A non-transitory computer-readable medium storing a set of instructions for wireless communication, the set of instructions comprising one or more instructions that, when executed by one or more processors of a device, cause the device to perform the method of one or more of Aspects 32-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a management network node, comprising:
   one or more memories; and
   one or more processors, coupled to the one or more memories, which are configured, individually or in any combination, to:

receive, from a communication network node, one or more configurations that enable the communication network node to provide or receive a radio frequency sensing service using control plane signaling and without establishing a data session; and
transmit, to the communication network node, an indication of a configuration selected from the received one or more configurations.

2. The apparatus of claim 1, wherein the one or more processors are further configured to:
receive a service activation request associated with the radio frequency sensing service; and
select the configuration, from the one or more configurations, based at least in part on information included in the service activation request.

3. The apparatus of claim 1, wherein the indication indicates to use the configuration.

4. The apparatus of claim 1, wherein the configuration indicates a set of time resources and frequency resources for providing the radio frequency sensing service.

5. The apparatus of claim 1, wherein the one or more processors are further configured to:
receive capability information associated with the communication network node; and
select the configuration, from the one or more configurations, based at least in part on the capability information associated with the communication network node.

6. The apparatus of claim 5, wherein the communication network node is a user equipment (UE), and wherein the capability information indicates whether the UE supports one or more features associated with the radio frequency sensing service.

7. The apparatus of claim 5, wherein the communication network node is a base station, and wherein the capability information indicates whether the base station supports one or more features associated with the radio frequency sensing service.

8. An apparatus for wireless communication at a management network node, comprising:
one or more memories; and
one or more processors, coupled to the one or more memories, which are configured, individually or in any combination, to:
receive, from a communication network node, a request to modify a configuration that enables the communication network node to provide or receive a radio frequency sensing service using control plane signaling and without establishing a data session; and
transmit, to the communication network node, a modified configuration that is based at least in part on the request to modify the configuration.

9. The apparatus of claim 8, wherein the request to modify the configuration includes information for modifying the configuration.

10. The apparatus of claim 9, wherein the information for modifying the configuration includes a preferred configuration.

11. The apparatus of claim 9, wherein the information for modifying the configuration includes a quality of service indication.

12. The apparatus of claim 9, wherein the information for modifying the configuration includes a cell measurement.

13. An apparatus for wireless communication at a communication network node, comprising:
one or more memories; and
one or more processors, coupled to the one or more memories, which are configured, individually or in any combination, to:
transmit, to a management network node, one or more configurations that enable the communication network node to provide or receive a radio frequency sensing service using control plane signaling and without establishing a data session; and
receive, from the management network node, an indication of a configuration selected from the transmitted one or more configurations.

14. The apparatus of claim 13, wherein the indication indicates to use the configuration.

15. The apparatus of claim 13, wherein the configuration indicates a set of time resources and frequency resources for providing the radio frequency sensing service.

16. The apparatus of claim 13, wherein the one or more processors are further configured to transmit capability information associated with the communication network node.

17. The apparatus of claim 16, wherein the communication network node is a user equipment (UE), and wherein the capability information indicates whether the UE supports one or more core network features associated with the radio frequency sensing service, or one or more radio access features associated with the radio frequency sensing service.

18. The apparatus of claim 16, wherein the communication network node is a base station, and wherein the capability information indicates whether the base station supports one or more features associated with the radio frequency sensing service.

19. The apparatus of claim 13, wherein the one or more processors are further configured to transmit a radio resource control (RRC) message that indicates the configuration, wherein the communication network node is a base station, and wherein the RRC message is a broadcast RRC message or a unicast RRC message.

20. The apparatus of claim 13, wherein the one or more processors are further configured to receive a radio resource control (RRC) message that indicates the configuration, wherein the communication network node is a user equipment, and wherein the RRC message is a broadcast RRC message or a unicast RRC message.

21. An apparatus for wireless communication at a communication network node, comprising:
one or more memories; and
one or more processors, coupled to the one or more memories, which are configured, individually or in any combination, to:
transmit, to a management network node, a request to modify a configuration that enables the communication network node to provide or receive a radio frequency sensing service using control plane signaling and without establishing a data session; and
receive, from the management network node, a modified configuration that is based at least in part on the request to modify the configuration.

22. The apparatus of claim 21, wherein the request to modify the configuration includes information for modifying the configuration.

23. The apparatus of claim 22, wherein the information for modifying the configuration includes a preferred configuration.

24. The apparatus of claim 22, wherein the information for modifying the configuration includes a cell measurement.

25. The apparatus of claim 1, wherein
the reception of the one or more configurations includes reception of a plurality of configurations that includes:
the one or more configurations, and
at least one of one or more configurations corresponding to a positioning service or one or more configurations corresponding to a timing synchronization service.

26. The apparatus of claim 1, wherein the configuration enables the communication network node to provide or receive a plurality of services that includes the radio frequency sensing service and one or more of a positioning service or a timing synchronization service.

27. The apparatus of claim 8, wherein the configuration enables the communication network node to provide or receive a plurality of services that includes the radio frequency sensing service and one or more of a positioning service or a timing synchronization service, and wherein the modified configuration enables the communication network node to provide or receive the plurality of services.

28. The apparatus of claim 13, wherein
the transmission of the one or more configurations includes transmission of a plurality of configurations that includes:
the one or more configurations, and
at least one of one or more configurations corresponding to a positioning service or one or more configurations corresponding to a timing synchronization service.

29. The apparatus of claim 21, wherein the configuration enables the communication network node to provide or receive a plurality of services that includes the radio frequency sensing service and one or more of a positioning service or a timing synchronization service, and wherein the modified configuration enables the communication network node to provide or receive the plurality of services.

* * * * *